UNITED STATES PATENT OFFICE.

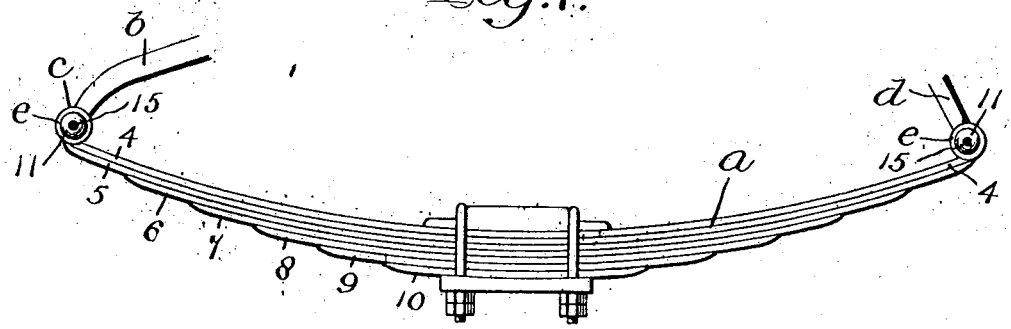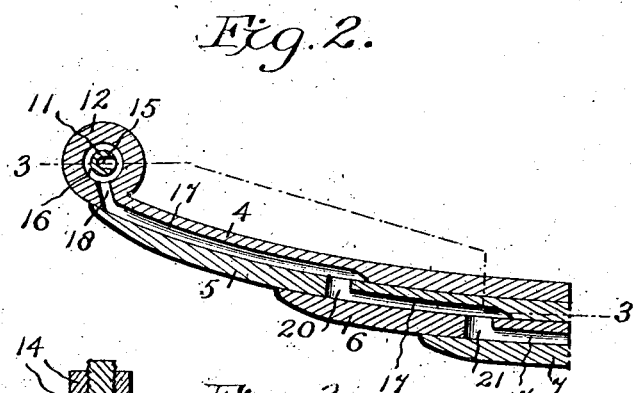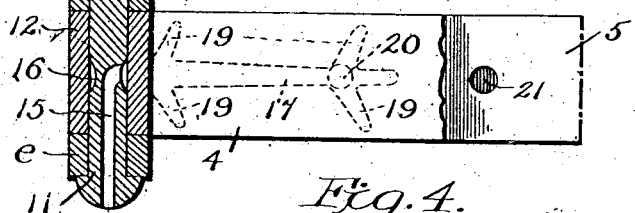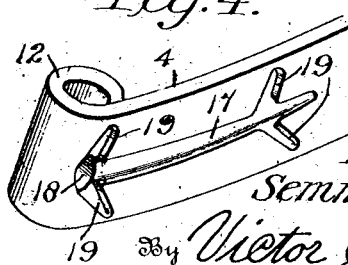

ROSSITER B. SEMMELROTH, OF BUFFALO, NEW YORK.

SPRING-OILING DEVICE.

1,114,541.　　　　Specification of Letters Patent.　　Patented Oct. 20, 1914.

Application filed February 20, 1914. Serial No. 820,057.

*To all whom it may concern:*

Be it known that I, ROSSITER B. SEMMELROTH, a citizen of the United States, residing at Buffalo, in the county of Erie and State of New York, have invented new and useful Improvements in Spring-Oiling Devices, of which the following is a specification.

The general objects of this invention are to increase the efficiency of a lubricant in a vehicle-spring and to broaden the lubricating area in such a spring. Heretofore springs have been provided, wherein were located narrow longitudinal ducts for the passage of a lubricant therethrough from one leaf to another; but the lubricant in such springs remained mostly in the channels and did not attain the results desired.

My improved spring is provided with herring-bone ducts which have a main channel and a series of feeders arranged at spaced intervals along the main channel, the ducts being fed by a lubricant through the pintles arranged in the ends of the spring.

Other objects will appear and be better understood from that embodiment of my invention of which the following is a specification, reference being had to the accompanying drawings forming part hereof, in which:—

Figure 1 is a side elevational view of my improved vehicle spring. Fig. 2 is an enlarged detail longitudinal sectional view of one end of the spring. Fig. 3 is a horizontal cross sectional view taken on the line 3—3 in Fig. 2. Fig. 4 is a detail perspective view of the knuckle portion of the uppermost leaf.

As shown in the drawings the spring which is generally indicated by *a* is of the usual shape and is composed of the leaves 4, 5, 6, 7, 8, 9 and 10. I have shown this number of leaves for the sole purpose of illustrating the present embodiment of the invention and it is to be understood that any quantity of leaves may be used with equal results. The spring *a* as shown in Fig. 1 is mounted on a vehicle such as an automobile chassis *b*, and is pivotally secured thereto by the pintles 11. This form of connection is the usual connection formed in springs of this type and consists of the upper leaf 4 being provided at its outer ends with the knuckles 12, which fit around the pintles 11, and the chassis-beam *c* is provided with a bifurcated knuckle *e* which fits around the pintle at either end of the spring, as is clearly shown. The parts are retained together by the nuts 14—14 which are mounted at the ends of the pintles.

The pintle is bored as indicated at 15 for a portion of its length substantially equal to half thereof, and the inner end of the bore is disposed angularly and communicates with an annular channel 16 provided on the periphery of the pintle at approximately the middle of its length. Thus it will be seen that this annular slot or channel 16 has direct communication with the outer end of the bore 15.

The leaves of the spring are provided at their under surfaces with the channels or ducts 17. In the uppermost leaf 4 a bore or passage 18 is provided in the knuckle portion 12 and thus affords communication between the channel 16 of the pintle and the duct 17 in the spring. Therefore, it will be seen that upon a lubricant, such as oil, grease or like, being introduced in the pintle bore 15, the lubricant will eventually find its way through the passage 18 and into the duct 17, whereupon, by virtue of the spring leaf being bowed, gravity will cause the lubricant to travel along the duct. The duct is provided with a series of oppositely disposed feeders 19 which are arranged at various intervals along the duct and thus admit of the lubricant spreading thereinto. Therefore, it is obvious that when the spring is in action the lubricant will spread over the upper surface of the next adjacent leaf 5 and thus lubricate the contacting surfaces. The leaf 5 is also provided with a vertical passage or bore 20, whereby the lubricant, after passing along the duct in the upper leaf may work its way down to the duct in the next lower leaf; whereupon the foregoing operation is repeated, and the lubricant passes through the bore 21 located in the third lowest leaf 6, until the entire spring may be thoroughly lubricated.

It is obvious that those skilled in the art may vary the details of construction and arrangements of parts without departing from the spirit of my invention and therefore I do not wish to be limited to such features except as may be required by the claim.

What is claimed as new is:

A vehicle spring comprising a series of contiguous bowed leaves, the bottom surfaces of the leaves being provided at each end with longitudinal grooves and a series of secondary grooves branching from the said longitudinal grooves, the grooves in the various leaves being inter-communicating, and bolts for pivotally connecting the spring to a vehicle, said bolts having central bores communicating with the grooves in the uppermost leaf for the purpose set forth.

In testimony whereof I affix my signature in presence of two witnesses.

ROSSITER B. SEMMELROTH.

Witnesses:
 FRANCIS N. HALLMAN,
 ANDREW J. WERNER.